US012610962B2

(12) United States Patent (10) Patent No.: US 12,610,962 B2

Takano et al. (45) Date of Patent: Apr. 28, 2026

(54) WATER-IN-OIL EMULSIFIED COMPOSITION AND METHOD FOR PRODUCING SAME

(71) Applicant: FUJI OIL HOLDINGS INC., Osaka (JP)

(72) Inventors: Kan Takano, Ibaraki (JP); Tomoaki Kumatani, Ibaraki (JP); Mikio Nakano, Ibaraki (JP)

(73) Assignee: FUJI OIL HOLDINGS INC., Osaka (JP)

( * ) Notice: Subject to any disclaimer, the term of this patent is extended or adjusted under 35 U.S.C. 154(b) by 1156 days.

(21) Appl. No.: 17/622,685

(22) PCT Filed: Jun. 22, 2020

(86) PCT No.: PCT/JP2020/024433

§ 371 (c)(1),
(2) Date: Dec. 23, 2021

(87) PCT Pub. No.: WO2020/262310

PCT Pub. Date: Dec. 30, 2020

(65) Prior Publication Data

US 2022/0225630 A1 Jul. 21, 2022

(30) Foreign Application Priority Data

Jun. 26, 2019 (JP) ................................. 2019-118210

(51) Int. Cl.
*A23D 7/00* (2006.01)
*B01F 23/41* (2022.01)
*B01F 23/43* (2022.01)

(52) U.S. Cl.
CPC .......... *A23D 7/003* (2013.01); *B01F 23/4145* (2022.01); *B01F 23/43* (2022.01)

(58) Field of Classification Search
CPC ........ A23D 7/01; A23D 7/003; B01F 23/4145
See application file for complete search history.

(56) References Cited

FOREIGN PATENT DOCUMENTS

| CN | 102056493 | 5/2011 |
|---|---|---|
| CN | 102480983 | 5/2012 |
| CN | 104039158 | 9/2014 |
| CN | 105685264 | 6/2016 |
| CN | 107853408 | 3/2018 |
| CN | 108777971 | 11/2018 |
| EP | 3434109 | 1/2019 |
| JP | H07308152 | 11/1995 |
| JP | H08322413 | 12/1996 |
| JP | H10155381 | 6/1998 |
| JP | 2003009774 | 1/2003 |
| JP | 2014193124 | 10/2014 |
| JP | 2018134053 | 8/2018 |
| JP | 2018166414 | 11/2018 |
| JP | 2019004875 | 1/2019 |

OTHER PUBLICATIONS

"International Search Report (Form PCT/ISA/210) of PCT/JP2020/024433", mailed on Sep. 1, 2020, with English translation thereof, pp. 1-4.
"Office Action of India Counterpart Application", issued on Feb. 3, 2023, with English translation thereof, p. 1-p. 6.
"Office Action of Korea Counterpart Application", issued on Sep. 30, 2024, with English translation thereof, p. 1-p. 14.
"Hearing Notice of India Counterpart Application", issued on Nov. 28, 2023, p. 1-p. 2.
Zhu Chen-Xi et al., "Chemical interesterification preparation the special oil for custard tart" with English Abstract, Science and Technology of Food Industry, vol. 34, Jun. 2013, pp. 169-173.
"Office Action of China Counterpart Application" with English translation thereof, issued on May 6, 2022, p. 1-p. 13.
"Search Report of Europe Counterpart Application", issued on May 31, 2022, p. 1-p. 7.
"Office Action of Singapore Counterpart Application", issued on Aug. 26, 2022, p. 1-p. 8.
"Office Action of Indonesia Counterpart Application", issued on Jun. 19, 2023, with English translation thereof, p. 1-p. 6.
"Office Action of Europe Counterpart Application", issued on Jul. 31, 2024, p. 1-p. 6.
Office Action of Korean Counterpart Application, with English translation thereof, issued on Feb. 29, 2024, pp. 1-8.
Office Action of Canadian Counterpart Application, issued on Apr. 2, 2024, pp. 1-4.

*Primary Examiner* — Vera Stulii
(74) *Attorney, Agent, or Firm* — JCIPRNET

(57) ABSTRACT

The present invention addresses the problem of providing a water-in-oil emulsified composition having improved workability in a freezing range. This water-in-oil emulsified composition contains, as constituent fatty acids, 7-29 wt % of lauric acid and 7-19 wt % of palmitic acid, the weight ratio of stearic acid/lauric acid being 0.1-1.6, and has a hardness of 500-1500 gf at −18° C. The water-in-oil emulsified composition according to the present invention, when delivered or stored in a frozen state, can be directly and easily cut into pieces in any shape without requiring an operation such as thawing or temperature adjustment.

3 Claims, No Drawings

WATER-IN-OIL EMULSIFIED COMPOSITION AND METHOD FOR PRODUCING SAME

CROSS-REFERENCE TO RELATED APPLICATION

This application is a 371 application of the International PCT application serial no. PCT/JP2020/024433, filed on Jun. 22, 2020, which claims the priority benefits of Japan Patent Application No. 2019-118210, filed on Jun. 26, 2019. The entirety of each of the above-mentioned patent applications is hereby incorporated by reference herein and made a part of this specification.

TECHNICAL FIELD

The present invention relates to improvement in workability in a freezing range of a water-in-oil emulsified composition.

BACKGROUND ART

Typical examples of a water-in-oil emulsified composition include butter, margarine and fat spreads. For professional use, these water-in-oil emulsified compositions are not only used as raw material oils and fats that are kneaded into dough at the time of baking, but also used as raw materials for confectionery production, baking, frozen desserts and the like by being melted and blended in.

Margarine or fat spreads are produced by a method in which an oil phase is prepared using, together with an emulsifier, an animal or vegetable oil or fat such as palm oil, safflower oil, soybean oil, rapeseed oil, coconut oil, lard or fish oil as it is or after being cured by adding hydrogen thereto, this oil phase and a water phase containing an emulsifier, stabilizer or a flavor ingredient such as skim milk or a fragrance in water are mixed and emulsified and then rapidly cooled and kneaded with a pin machine or a votator.

Water-in-oil emulsified compositions produced as described above are packaged in a variety of forms depending on intended uses, and typical examples thereof include a block shape of approximately 100 g to 200 g for general household use and a block shape of 10 kg to 30 kg for professional use.

Normally, these water-in-oil emulsified compositions are cooled to a refrigeration temperature of approximately 5° C. or a freezing temperature of approximately −25° C. to −10° C. and delivered and stored. At this time, since oils and fats that configure the water-in-oil emulsified compositions solidify and form a network, the hardness significantly increases, which has created a difficulty in cutting the water-in-oil emulsified compositions into an appropriate size or shape before use. Particularly, in professional use, since there are a number of frozen goods, there has been a need to prepare these frozen goods being softened by thawing or temperature adjustment or being finely cut or the like using a food crusher or cutter in advance before use.

A variety of studies are underway to solve problems of the use of such water-in-oil emulsified compositions. For example, Patent Literature 1 discloses an easily dividable water-in-oil emulsified composition in which a plurality of water-in-oil emulsified compositions molded in an arbitrary size are in contact with one another in series through torn surfaces. In addition, Patent Literature 2 discloses a method in which a torn surface layer of a water layer is formed in a water-in-oil emulsified composition having an appropriate size, and Patent Literature 3 discloses a method for producing a precut water-in-oil emulsified composition. Furthermore, Patent Literature 4 discloses a method in which mist-like sterile water is sprayed onto an ejected water-in-oil emulsified composition to form a water film and the water film is instantly frozen and cut into an arbitrary length, thereby producing a precut water-in-oil emulsified composition.

CITATION LIST

Patent Literature

[Patent Literature 1]
Japanese Patent Laid-Open No. 2014-193124
[Patent Literature 2]
Japanese Patent Laid-Open No. H7-308152
[Patent Literature 3]
Japanese Patent Laid-Open No. H8-322413
[Patent Literature 4]
Japanese Patent Laid-Open No. H10-155381

SUMMARY OF INVENTION

Technical Problem

An objective of the present invention is to provide a water-in-oil emulsified composition having improved workability in a freezing range.

Solution to Problem

The present inventors conducted intensive studies to solve the problems.

In the methods of Patent Literature 1 and Patent Literature 2, there has been a problem in that, in a case where the water layer that serves as the torn surface is frozen, the water-in-oil emulsified composition cannot be easily divided, and the water-in-oil emulsified composition is cracked at a portion other than the torn surface. In addition, in the method of Patent Literature 3, there has been a problem in that, in the case of molding the water-in-oil emulsified composition into a large block shape of 10 kg to 30 kg, a large-scale facility is required or workability during production is poor since the shape of the water-in-oil emulsified composition is determined by the shape of a mold. Furthermore, in the method of Patent Literature 4, although the water-in-oil emulsified composition can be divided even in a frozen state, three days is required for thawing and the work efficiency is low.

As a result of repeating intensive studies regarding the above-described problems, the present inventors found that, when the hardness at −18° C. is set to 500-1500 gf, water-in-oil emulsified compositions that have been delivered or stored in a frozen state can be used as they are without thawing or temperature adjustment and completed the present invention.

That is, the present invention relates to
(1) a water-in-oil emulsified composition having a hardness (rheometer measurement value, plunger diameter: 3 mm and intrusion rate: 5 cm/min) of 500-1500 gf at −18° C.,
(2) the water-in-oil emulsified composition according to (1) containing, as constituent fatty acids, 7-29 wt % of lauric acid and 7-19 wt % of palmitic acid, a weight ratio of stearic acid/lauric acid being 0.1-1.6,
(3) the water-in-oil emulsified composition according to (1) or (2), in which a difference between the hardness at −18° C. and a hardness (rheometer measurement value, plunger diameter: 10 mm and intrusion rate: 5 cm/min) at 20° C. is 300-1200 gf, (4) the water-in-oil emulsified composition according to any one of (1) to (3), in which a water phase is 10-35 wt %, a total content of a liquid-form oil is 27-60 wt %, and a total content of a lauric oil and fat and/or a transesterified oil containing, as a constituent fatty acid, lauric acid is 15-49 wt %, (5) the water-in-oil emulsified composition according to any one of (1) to (4) containing a transesterified oil containing, as constituent fatty acids, 5-25 wt % of lauric acid, 5-25 wt % of palmitic acid and 10-35 wt % of stearic acid, a weight ratio of stearic acid/palmitic acid being 0.5-7, (6) the water-in-oil emulsified composition according to any one of (1) to (5) that is for delivery in a frozen state and/or for storage in a frozen state, and (7) a method for producing a water-in-oil emulsified composition that can be used in a frozen state, in which an oil phase is blended so as to contain, as constituent fatty acids, 7-29 wt % of lauric acid and 7-19 wt % of palmitic acid, a weight ratio of stearic acid/lauric acid being 0.1-1.6, and a hardness (rheometer measurement value, plunger diameter: 3 mm and intrusion rate: 5 cm/min) at −18° C. is set to 500-1500 gf.

Advantageous Effects of Invention

A water-in-oil emulsified composition of the present invention has a hardness of 500-1500 gf at −18° C. and enables the use of a water-in-oil emulsified composition that has been delivered or stored in a frozen state as it is without thawing or temperature adjustment.

DESCRIPTION OF EMBODIMENTS

A water-in-oil emulsified composition of the present invention has a hardness of 500-1500 gf at −18° C. The hardness at −18° C. is more preferably 550-1400 gf and still more preferably 600-1300 gf. When the hardness at −18° C. exceeds the upper limit, there is a case where the workability at −18° C. becomes poor. On the other hand, when the hardness at −18° C. is less than the lower limit, there is a case where the production aptitude deteriorates. In the present invention, the hardness at −18° C. refers to a numerical value measured from a measurement sample (length: 5 cm, width: 5 cm and thickness: 5 cm) that has been left to stand for one night or longer at −18° C. using a rheometer with a plunger diameter of 3 mm at an intrusion rate of 5 cm/min.

The water-in-oil emulsified composition of the present invention preferably has a hardness of 600 gf or less at 20° C. The hardness at 20° C. is more preferably 500 gf or less and still more preferably 400 gf or less. When the hardness at 20° C. exceeds the upper limit, there is a case where the workability becomes poor. The hardness at 20° C. is measured under the same conditions as in the measurement of the hardness at −18° C. except that the measurement sample is left to stand for one night or longer at 20° C. and the plunger diameter is changed to 10 mm.

In addition, in the water-in-oil emulsified composition of the present invention, the difference between the hardness at −18° C. and the hardness at 20° C. is preferably 300-1200 gf. The difference between the hardness at −18° C. and the hardness at 20° C. is more preferably 350-1100 gf and still more preferably 400-1000 gf. When the difference between the hardness at −18° C. and the hardness at 20° C. exceeds the upper limit, there is a case where the workability at −18° C. becomes poor. On the other hand, when difference between the hardness at −18° C. and the hardness at 20° C. is less than the lower limit, there is a case where the production aptitude deteriorates.

In the water-in-oil emulsified composition of the present invention, the content of lauric acid as a constituent fatty acid is preferably 7-29 wt %. The content of the lauric acid as a constituent fatty acid is more preferably 9-25 wt % and still more preferably 11-22 wt %. When the content of the lauric acid as a constituent fatty acid is less than the lower limit, there is a case where the workability at −18° C. becomes poor. On the other hand, when the content of the lauric acid as a constituent fatty acid exceeds the upper limit, there is a case where the production aptitude deteriorates.

In the water-in-oil emulsified composition of the present invention, the content of palmitic acid as a constituent fatty acid is preferably 7-19 wt %. The content of the palmitic acid as a constituent fatty acid is more preferably 9-17 wt % and still more preferably 10-15 wt %. When the content of the palmitic acid as a constituent fatty acid is less than the lower limit, there is a case where the production aptitude deteriorates. On the other hand, when the content of the palmitic acid as a constituent fatty acid exceeds the upper limit, there is a case where the workability at −18° C. becomes poor. The constituent fatty acids in the present invention refer to fatty acids in an oil and fat mixture that constitutes the water-in-oil emulsified composition, and a fatty acid that constitutes an emulsifier is not taken into account. Therefore, the content of the constituent fatty acids is not affected by the moisture content of the water-in-oil emulsified composition.

In the water-in-oil emulsified composition of the present invention, the content of stearic acid as a constituent fatty acid is preferably 2-17 wt %. The content of the stearic acid as a constituent fatty acid is more preferably 3-14 wt % and still more preferably 4-12 wt %. When the content of the stearic acid as a constituent fatty acid is less than the lower limit, there is a case where the production aptitude deteriorates. On the other hand, when the content of the stearic acid as a constituent fatty acid exceeds the upper limit, there is a case where the emulsifying property of the water-in-oil emulsified composition becomes poor.

In the water-in-oil emulsified composition of the present invention, the weight ratio of stearic acid/lauric acid that are the constituent fatty acids is preferably 0.1-1.6. The weight ratio of stearic acid/lauric acid that are the constituent fatty acids is more preferably 0.2-1.0 and still more preferably 0.2-0.7. When the weight ratio of stearic acid/lauric acid that are the constituent fatty acids is less than the lower limit, there is a case where the production aptitude deteriorates. On the other hand, when the weight ratio of stearic acid/lauric acid that are the constituent fatty acids exceeds the upper limit, there is a case where the workability at −18° C. becomes poor.

The water phase content of the water-in-oil emulsified composition of the present invention is preferably 10-35 wt %. The water phase content of the water-in-oil emulsified composition is more preferably 12-30 wt % and still more preferably 13-27 wt %. Here, a water phase in the present invention refers to, in raw materials of the water-in-oil emulsified composition, a mixture of water and a raw material that dissolves in water. When the water phase content of the water-in-oil emulsified composition is less than the lower limit, there is a case where the production aptitude deteriorates. On the other hand, when the water phase content of the water-in-oil emulsified composition exceeds the upper limit, there is a case where the emulsifying property of the water-in-oil emulsified composition becomes poor.

In the water-in-oil emulsified composition of the present invention, the content of a liquid-form oil is preferably 27-60 wt %. The content of the liquid-form oil is more preferably 29-58 wt %. As the liquid-form oil in the present invention, one or more selected from canola oil, soybean oil, corn oil, sunflower oil, rice bran oil, cottonseed oil, safflower oil and the like can be used. When the content of the liquid-form oil is less than the lower limit, there is a case where the workability at −18° C. becomes poor. On the other hand, when the content of the liquid-form oil exceeds the upper limit, there is a case where the emulsifying property of the water-in-oil emulsified composition becomes poor.

In the water-in-oil emulsified composition of the present invention, the content of a lauric oil and fat is preferably 15-49 wt %. The content of the lauric oil and fat is more preferably 17-46 wt %. As the lauric oil and fat in the present invention, one or more selected from fractionated oil, hydrogenated oil and transesterified oil thereof, which are exemplified by coconut oil, palm kernel oil, babassu oil, and palm kernel stearin, can be used and, in the case of the hydrogenated oil, an extremely hydrogenated oil is preferable. When the content of the lauric oil and fat is less than the lower limit, there is a case where the workability at −18° C. becomes poor. On the other hand, when the content of the lauric oil and fat exceeds the upper limit, there is a case where the production aptitude of the water-in-oil emulsified composition deteriorates.

In addition, in the present invention, a transesterified oil containing lauric acid as a constituent fatty acid can also be used as a part or all of the lauric oil and acid. The transesterified oil that is used in the water-in-oil emulsified composition of the present invention is preferably a transesterified oil in which the content of a lauric acid is 5-25 wt %, the content of a palmitic acid is 5-25 wt %, the content of stearic acid is 10-35 wt % and the weight ratio (St/P ratio) of stearic acid/palmitic acid is 0.5-7, and more preferably, a transesterified oil in which the content of a lauric acid is 10-20 wt %, the content of a palmitic acid is 5-20 wt %, the content of stearic acid is 15-35 wt % and the St/P ratio is 0.8-5 can be exemplified.

The transesterified oil containing lauric acid as a constituent acid, which is used in the water-in-oil emulsified composition of the present invention, can be obtained by, for example, blending 10-50 wt % of a lauric oil and fat as a lauric acid source, 0-75 wt % of a palm-based oil and fat as a palmitic acid source and 10-30 wt % of an extremely hydrogenated oil of a liquid-form oil or a natural oil and fat that is rich in stearic acid as a stearic acid source and then performing transesterification.

As the palm-based oil and fat in the present invention, one or more selected from a palm fractionated oil such as palm oil, palm olein, super palm olein, palm mid fraction or palm stearin, hydrogenated oil and transesterified oil thereof can be used, and, in the case of the hydrogenated oil, an extremely hydrogenated oil is preferable.

In the present invention, as the extremely hydrogenated oil of a liquid-form oil, one or more selected from extremely hydrogenated oils of an oil and fat that are rich in an unsaturated fatty acid having 18 carbon atoms such as canola oil, soybean oil, corn oil, sunflower oil, rice bran oil, cottonseed oil and safflower oil can be used. As the natural oil and fat that is rich in stearic acid, one or more selected from shea butter, shorea butter, kokum fat, mango fat, allanblackia fat and fractionated oil, hydrogenated oil and transesterified oil thereof can be used and, in the case of the hydrogenated oil, an extremely hydrogenated oil is preferable.

The reaction of transesterification in the present invention may be a method in which a chemical catalyst such as sodium methylate is used or a method in which an enzyme such as lipase is used and may be a non-selective randomization reaction or a position-specific selective transesterification reaction, but is preferably a non-selective randomization reaction.

To the water-in-oil emulsified composition of the present invention, an emulsifier may be added as necessary. Examples of the emulsifier include sucrose fatty acid ester, glycerin fatty acid ester, polyglycerin fatty acid ester, polyglycerin condensed ricinoleic acid ester, sorbitan fatty acid ester, polyoxyethylene sorbitan fatty acid ester, propylene glycol fatty acid ester, a variety of organic acid monoglycerides such as acetylated monoglyceride, tartrate monoglyceride, tartrate/acetate-mixed monoglyceride, citrate monoglyceride, diacetyl tartrate monoglyceride, lactate monoglyceride, succinate monoglyceride and malate monoglyceride, calcium stearoyl lactylate, sodium stearoyl lactylate, lecithin, and the like.

In the water-in-oil emulsified composition, in addition to the above-described oils and fats and additives, an oil-soluble component such as a pigment, an antioxidant or a fragrance and a water-soluble component such as an organic acid, a salt, a sugar, milk powder or fermented milk can be used as desired as long as the effect of the present invention is not impaired.

The water-in-oil emulsified composition of the present invention is preferably delivered in freezing temperature ranges and used for direct meal or kneading use. In addition, since the hardness that is a rheometer measurement value at 20° C. is preferably 600 gf or less, there is a case where the water-in-oil emulsified composition of the present invention is too soft for roll-in use.

A method for producing the water-in-oil emulsified composition of the present invention is not particularly limited, and the water-in-oil emulsified composition of the present invention can be produced by, as in an ordinary method, emulsifying an oil phase and a water phase in advance and then rapidly cooling and kneading the emulsified oil phase and water phase with a perfector, a votator, a combinator or the like. The oil phase can be prepared by adding, dissolving and dispersing an oil-soluble component such as a pigment, an antioxidant or a fragrance as necessary in a molten oil and fat. The water phase can be prepared by adding, dissolving and dispersing a water-soluble milk component and, as necessary, a salt, a sugar, an inorganic salt or the like in water or warm water.

EXAMPLES

Hereinafter, the present invention will be described in more detail with examples relating to the present invention and comparative examples. In the examples, "%" and "parts" are all weight-based.

The fatty acid composition of an oil and fat was measured by a method regulated in 2.4.1.2 Methyl esterification method (boron trifluoride-methanol method) in Standard methods for the analysis of fats, oils and related materials by Japan Oil Chemists' Society (1996 version).

(Preparation of Oil and Fat A)

30 Parts by weight of a high-oleic sunflower oil containing 86% of oleic acid with other constituent fatty acids and 70 parts by weight of ethyl stearate were mixed and trans-esterification was performed using a 1,3-position selective lipase, thereby obtaining a reaction oil. Ethyl ester was distilled away from this reaction oil by distillation, solvent fractionation was performed using acetone, and decolorizing and deodorizing were performed as in an ordinary method, thereby obtaining an oil and fat A (iodine value: 59.0), which was a fractionation low fraction, as a purified oil.

(Preparation of Transesterified Oil and Fat)

12.5 Parts of a palm oil fractionation low fraction (iodine value: 67.0), 43.5 parts of a palm kernel oil fractionation low fraction (iodine value: 26.0), 26.0 parts of an extremely hydrogenated oil of a palm oil (iodine value: 0.5 or less) and 18.0 parts of the oil and fat A were mixed, 0.3% by weight of sodium methylate with respect to the oil mixture was added as a catalyst, a non-selective transesterification reaction was performed for 40 minutes at 80° C. and a vacuum degree of 20 Torr, then, the reaction product was washed with water and dehydrated and subjected to an ordinary purification step, thereby obtaining a transesterified oil and fat. The obtained transesterified oil and fat contained 19.5 wt % of lauric acid, 19.5 wt % of palmitic acid and 22.0 wt % of stearic acid as constituent fatty acids, respectively, and the weight ratio of the stearic acid/the palmitic acid was 1.1.

A water-in-oil emulsified composition was prepared according to the following "method for preparing a water-in-oil emulsified composition".

"Method for Preparing Water-in-Oil Emulsified Composition"

1. An oil and fat mixture was melted at 60° C. to 70° C. and an emulsifier was added, thereby preparing an oil phase.

2. A raw material that was classified as a water-phase raw material was added and dissolved in water.

3. The water phase was added to and mixed with an oil phase under stirring. A liquid mixture that was obtained here will be referred to as the prepared liquid.

4. The prepared liquid was fed into a combinator, thereby obtaining a water-in-oil emulsified composition.

A water-in-oil emulsified composition was prepared according to the above-described "method for preparing a water-in-oil emulsified composition" and a formulation shown in Table 1 below. First, an oil and fat mixture composed of 15.0 parts by weight of palm kernel stearin, 8.0 parts by weight of the transesterified oil and 52.0 parts by weight of soybean oil was prepared. 0.5 Parts by weight of an emulsifier was mixed with 75.0 parts by weight of this oil and fat mixture, thereby producing an oil phase. Next, 24.5 parts by weight of water was added as a water phase to the oil phase and stirred with a propeller stirrer, thereby obtaining an emulsion (approximately 60° C.). This was rapidly cooled and kneaded with the combinator, thereby obtaining a water-in-oil emulsified composition of Example 1.

A water-in-oil emulsified composition of Example 2 was obtained in the same manner as in Example 1 except that the oil and fat mixture was changed to contain 25.0 parts by weight of palm kernel stearin, 8.0 parts by weight of the transesterified oil and 42.0 parts by weight of soybean oil according to a formulation shown in Table 1 below.

Water-in-oil emulsified compositions of Examples 3 to 8 and Comparative Examples 1 to 3 were obtained in the same manner as in Example 2 except that the oil and fat mixture was changed according to formulations shown in Table 1 below.

A water-in-oil emulsified composition of Example 9 was obtained in the same manner as in Example 1 except that the amounts of the oil and fat mixture and water as the water phase were changed to 85.0 parts by weight and 14.5 parts by weight, respectively, according to formulations shown in Table 1 below.

As a water-in-oil emulsified composition of Comparative Example 4, butter containing 16.2% by weight of moisture (manufactured by Megmilk Snow Brand Co., Ltd.) was used.

TABLE 1

| Formulations of water-in-oil emulsified compositions | | | | | | |
| --- | --- | --- | --- | --- | --- | --- |
| | Example | | | | | |
| | 1 | 2 | 3 | 4 | 5 | 6 | 7 |
| Palm kernel stearin | 15.0 (%) | 25.0 | 30.0 | 15.0 | 15.0 | 15.0 | 35.0 |
| Transesterified oil | 8.0 | 8.0 | 8.0 | 4.0 | 15.0 | 29.4 | 0.0 |
| Soybean oil | 52.0 | 42.0 | 37.0 | 56.0 | 45.0 | 30.6 | 40.0 |
| Water | 24.5 | 24.5 | 24.5 | 24.5 | 24.5 | 24.5 | 24.5 |
| Emulsifier | 0.5 | 0.5 | 0.5 | 0.5 | 0.5 | 0.5 | 0.5 |

| | Example | | Comparative Example | | | |
| --- | --- | --- | --- | --- | --- | --- |
| | 8 | 9 | 1 | 2 | 3 | 4 |
| Palm kernel stearin | 0.0 | 34.0 | 40.0 | 25.0 | | |
| Transesterified oil | 40.0 (%) | 9.0 | 80.0 | 25.0 | | |
| Palm oil | | | | | 35.0 | |
| Soybean oil | 35.0 | 42.0 | 27.0 | 25.0 | 40.0 | |
| Water | 24.5 | 14.5 | 24.5 | 24.5 | 24.5 | |
| Emulsifier | 0.5 | 0.5 | 0.5 | 0.5 | 0.5 | |
| Butter | | | | | | 100.0 |

The unit is "% by weight".

As emulsifiers, stearate monoglyceride and lecithin were used.

The water-in-oil emulsified compositions obtained in the examples and the comparative examples were evaluated by five panelists who were developing water-in-oil emulsified compositions at work and produced trial products of water-in-oil emulsified compositions on a daily basis based on the following evaluation standards. At this time, ratings of AA and A that were determined by consensual decision making, respectively, were regarded as pass.

Production Aptitude

AA: A water-in-oil emulsified composition is easily produced in an appropriate hardness when filled, and block molding is also easy.

A: While slightly hard when filled, a water-in-oil emulsified composition can be produced, and block molding is also possible.

B: A water-in-oil emulsified composition is too hard when filled, and there is a possibility that the production may be hindered. Block molding is not possible.

Workability at −18° C.

AA: A water-in-oil emulsified composition can be easily cut into an arbitrary shape with a kitchen knife.

A: A water-in-oil emulsified composition can be cut into an arbitrary shape with a kitchen knife while a slight force is required.

B: When attempted to be cut with a kitchen knife, a water-in-oil emulsified composition break irregularly and cannot be cut into an arbitrary shape.

C: It is difficult to cut a water-in-oil emulsified composition with a kitchen knife.

Workability at 20° C.

AA: A water-in-oil emulsified composition has plasticity and is also preferable for kneading use.

A: A water-in-oil emulsified composition has slightly weak plasticity, but can be used for kneading use.

B: A water-in-oil emulsified composition has no plasticity and poor workability. In kneading use, a water-in-oil emulsified composition is not kneaded into dough.

"Method for Measuring Hardness"

1. A measurement sample was molded to be 5 cm in length, 5 cm in width and 5 cm in thickness.

2. The measurement sample was moved into a refrigerated vehicle (−18° C.) or a temperature adjustable vehicle (20° C.) and left to stand for 24 hours or longer.

3. The hardness was measured with a rheometer (manufactured by Rheotech, RTC-3002D) with a plunger diameter of 3 mm (−18° C.) or 10 mm (20° C.) at an intrusion rate of 5 cm/min.

For the water-in-oil emulsified compositions obtained in the examples and the comparative examples, the hardness measured by the above-described "method for measuring hardness" and the evaluation results are summarized in Table 2.

TABLE 2

Evaluation of kneading aptitude

| | Example | | | | | | |
|---|---|---|---|---|---|---|---|
| | 1 | 2 | 3 | 4 | 5 | 6 | 7 |
| Fatty acid composition in oil phase | | | | | | | |
| C12 (%) | 13.1 | 20.4 | 24.0 | 12.0 | 14.9 | 18.6 | 25.6 |
| C16 (%) | 11.4 | 11.2 | 11.0 | 10.9 | 12.2 | 13.9 | 10.0 |
| C18 (%) | 5.7 | 5.4 | 5.2 | 4.7 | 7.3 | 10.7 | 3.2 |
| Weight ratio of C18/C12 | 0.44 | 0.26 | 0.22 | 0.39 | 0.49 | 0.58 | 0.13 |
| Evaluation of water-in-oil emulsified composition | | | | | | | |
| Production aptitude | A | AA | A | AA | AA | AA | A |
| Hardness at −18° C. (gf) | 800 | 1100 | 1380 | 730 | 860 | 970 | 1430 |
| Hardness at 20° C. (gf) | 120 | 310 | 390 | 100 | 170 | 230 | 560 |
| Difference between hardness at −18° C. and hardness at 20° C. | 680 | 790 | 990 | 630 | 690 | 740 | 870 |
| Workability at −18° C. | AA | AA | A | AA | AA | AA | A |
| Workability at 20° C. | A | AA | A | A | A | AA | A |

| | Example | | Comparative Example | | | |
|---|---|---|---|---|---|---|
| | 8 | 9 | 1 | 2 | 3 | 4 |
| Fatty acid composition in oil phase | | | | | | |
| C12 (%) | 10.4 | 24.0 | 31.4 | 24.8 | 0.0 | 3.6 |
| C16 (%) | 15.4 | 11.0 | 10.8 | 13.1 | 26.6 | 32.2 |
| C18 (%) | 13.7 | 5.2 | 4.9 | 9.4 | 4.2 | 11.6 |
| Weight ratio of C18/C12 | 1.32 | 0.22 | 0.16 | 0.38 | 91.00 | 3.22 |
| Evaluation of water-in-oil emulsified composition | | | | | | |
| Production aptitude | AA | AA | B | A | B | — |
| Hardness at −18° C. (gf) | 1380 | 1190 | 1640 | 1600 | 1860 | — |
| Hardness at 20° C. (gf) | 290 | 290 | 680 | 360 | 330 | 630 |
| Difference between hardness at −18° C. and hardness at 20° C. | 1090 | 900 | 960 | 1240 | 1530 | — |
| Workability at −18° C. | A | AA | C | B | C | C |
| Workability at 20° C. | A | A | A | A | A | A |

In Comparative Example 4, a commercially available product was used, and thus it was not possible to evaluate the production aptitude. In addition, the hardness at −18° C. exceeded 2000 gf and could not be measured with a plunger diameter of 3 mm.

INDUSTRIAL APPLICABILITY

The present invention relates to a water-in-oil emulsified composition and more specifically to improvement in the workability of a water-in-oil emulsified composition in a freezing range. In addition, a change in the product temperature during use can be suppressed, and deterioration of products stored in a frozen state is further delayed. Therefore, the present invention can be an effective technique from the viewpoint of food waste reduction, environmental protection and energy saving.

The invention claimed is:

1. A water-in-oil emulsified composition, comprising:
10-35 wt % of a water phase with respect to 100 wt % of the water-in-oil emulsified composition; and
an oil phase;
wherein the water-in-oil emulsified composition comprises:
27-60 wt % of a liquid-form oil with respect to 100 wt % of the water-in-oil emulsified composition; and
a total content of 15-49 wt % of a palm kernel stearin, and/or a transesterified oil containing lauric acid as a constituent fatty acid with respect to 100 wt % of the water-in-oil emulsified composition, wherein the liquid-form oil is one or more selected from the group consisting of canola oil, soybean oil, corn oil, sunflower oil, rice bran oil, cottonseed oil, and safflower oil,
the transesterified oil contains, as constituent fatty acids, 5-25 wt % of lauric acid, 5-25 wt % of palmitic acid and 10-35 wt % of stearic acid, a weight ratio of stearic acid/palmitic acid being 0.5-7, and
wherein the water-in-oil emulsified composition contains, as constituent fatty acids, 7-19 wt % of palmitic acid and 7-29 wt % of lauric acid, and a weight ratio of stearic acid/lauric acid being 0.1-1.6,
wherein the water-in-oil emulsified composition has a hardness of 500-1500 gf at −18° C. as measured with a rheometer using a plunger diameter of 3 mm and an intrusion rate of 5 cm/min.
2. The water-in-oil emulsified composition according to claim 1,
wherein a difference between the hardness of the water-in-oil emulsified composition at −18° C. and a hardness of the water-in-oil emulsified composition at 20° C. is 300-1200 gf, wherein the hardness of the water-in-oil emulsified composition at 20° C. is a value measured with a rheometer, in which a plunger diameter is 10 mm and an intrusion rate is 5 cm/min.
3. A method for producing the water-in-oil emulsified composition according to claim 1, the method comprising emulsifying the oil phase and the water phase to obtain the water-in-oil emulsified composition.

* * * * *